US012388706B2

(12) United States Patent
Takada et al.

(10) Patent No.: US 12,388,706 B2
(45) Date of Patent: Aug. 12, 2025

(54) CORRECT ANSWER DATA GENERATION APPARATUS, CORRECT ANSWER DATA GENERATION METHOD AND CORRECT ANSWER DATA GENERATION PROGRAM

(71) Applicant: Nippon Telegraph and Telephone Corporation, Tokyo (JP)

(72) Inventors: Atsushi Takada, Musashino (JP); Naoki Hayashi, Musashino (JP); Ryosuke Sato, Musashino (JP); Toshihiko Seki, Musashino (JP); Kyoko Yamagoe, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/567,312

(22) PCT Filed: Jun. 7, 2021

(86) PCT No.: PCT/JP2021/021593
§ 371 (c)(1),
(2) Date: Dec. 5, 2023

(87) PCT Pub. No.: WO2022/259324
PCT Pub. Date: Dec. 15, 2022

(65) Prior Publication Data
US 2024/0275662 A1    Aug. 15, 2024

(51) Int. Cl.
*H04L 41/0631* (2022.01)
*H04L 41/0677* (2022.01)
*H04L 41/16* (2022.01)

(52) U.S. Cl.
CPC ........ *H04L 41/064* (2013.01); *H04L 41/0677* (2013.01); *H04L 41/16* (2013.01)

(58) Field of Classification Search
CPC .... H04L 41/064; H04L 41/0677; H04L 41/16
See application file for complete search history.

(56) References Cited

U.S. PATENT DOCUMENTS

| | | | |
|---|---|---|---|
| 7,389,345 B1 * | 6/2008 | Adams | H04L 43/0817 709/224 |
| 2017/0235623 A1 * | 8/2017 | Brew | H04L 41/065 714/37 |
| 2020/0410839 A1 * | 12/2020 | Bickel | H02J 3/00125 |

OTHER PUBLICATIONS

Sato et al., "Proposing an Algorithm for Precise Alarm Correlation and Root Cause Analysis by Referring Network Topology," IEICE Technical Report, Mar. 2020, 116(438):129-134, 13 pages (with English translation).

* cited by examiner

Primary Examiner — Philip C Lee
(74) Attorney, Agent, or Firm — Fish & Richardson P.C.

(57) ABSTRACT

A correct data generation device 1 includes: an acquisition unit 11 that acquires alarm information output from a plurality of devices; a correlation unit 13 that associates, from the alarm information, alarms whose occurrence times are within a first time width and recovery times are within a second time width, as a group of alarms that have occurred by the same event; and a generation unit 14 that generates correct data in which identification information of the event is set for each alarm of the group of alarms that has been associated.

9 Claims, 6 Drawing Sheets

CORRECT ANSWER DATA GENERATION APPARATUS, CORRECT ANSWER DATA GENERATION METHOD AND CORRECT ANSWER DATA GENERATION PROGRAM

CROSS-REFERENCE TO RELATED APPLICATIONS

This application is a National Stage application under 35 U.S.C. § 371 of International Application No. PCT/JP2021/021593, having an International Filing Date of Jun. 7, 2021.

The disclosure of the prior application is considered part of the disclosure of this application, and is incorporated by reference in its entirety into this application.

TECHNICAL FIELD

The present invention relates to a correct data generation device, a correct data generation method, and a correct data generation program.

BACKGROUND ART

Network monitoring operation work has a process of detecting a state change and an alarm of a device by continuous monitoring, grasping an event such as a failure or construction, analyzing and determining division of failure factors or the like, and performing (handling) failure recovery.

This process is achieved by a maintenance person (remote worker) who manages the entire network sending a local worker to a site when physical work such as repair and replacement of a failed device on the site is required. The maintenance person performs management of the devices arranged all over the country remotely from an aggregation base.

In order to handle an event that has occurred in a network, it is important for the maintenance person to grasp what kind of event (construction or failure) has caused the detected group of alarms.

Non Patent Literature 1 discloses a technology of correlating a plurality of alarms occurring by one event by combining network connection configuration information and a predefined rule.

CITATION LIST

Non Patent Literature

Non Patent Literature 1: "Proposing an Algorithm for Precise Alarm Correlation and Root Cause Analysis by referring Network Topology", IEICE Technical Committee on Information and Communication Management (ICM), 2020/3/2

SUMMARY OF INVENTION

Technical Problem

An alarm is generated from a plurality of devices by one event, and a plurality of events occur simultaneously in a network across the country, so that a large number of alarms are generated. A maintenance person correlates (associates) the group of alarms for each event.

A method using machine learning has been proposed as a technology of automating association. However, in a case of using machine learning, it is necessary to learn a large amount of correct data in which alarms are correlated in units of events.

However, manually checking several tens of thousands of alarms generated per day one by one and giving a result of correlation to each alarm would increase the burden on the maintenance person. Therefore, it is desired to easily generate correct data.

Although it is possible to generate alarm correlation data on the basis of the method of Non Patent Literature 1 and use the data for machine learning, the maintenance person needs to define a rule in advance. Therefore, the creation of correct data using Non Patent Literature 1 requires rule definition by a maintenance person, and not all can be automated.

The present invention has been made in view of the above circumstances, and an object of the present invention is to provide a correct data generation device, a correct data generation method, and a correct data generation program for easily generating correct data for causing machine learning of alarm correlation.

Solution to Problem

In order to achieve the above object, an aspect of the present invention includes: an acquisition unit that acquires alarm information output from a plurality of devices; a correlation unit that associates, from the alarm information, alarms whose occurrence times are within a first time width and recovery time is within a second time width, as a group of alarms that have occurred by a same event; and a generation unit that generates correct data in which identification information of the event is set for each alarm of the group of alarms that has been associated.

An aspect of the present invention is a correct data generation method performed by a correct data generation device, the method including steps of: acquiring alarm information output from a plurality of devices; associating, from the alarm information, alarms whose occurrence times are within a first time width and recovery time is within a second time width, as a group of alarms that have occurred by a same event; and generating correct data in which identification information of the event is set for each alarm of the group of alarms that has been associated.

An aspect of the present invention is a correct data generation program for causing a computer to function as the correct data generation device.

Advantageous Effects of Invention

According to the present invention, it is possible to provide a correct data generation device, a correct data generation method, and a correct data generation program for easily generating correct data for causing machine learning of alarm correlation.

DESCRIPTION OF EMBODIMENTS

Hereinafter, an embodiment of the present invention will be described with reference to the drawings.

Figure 1:
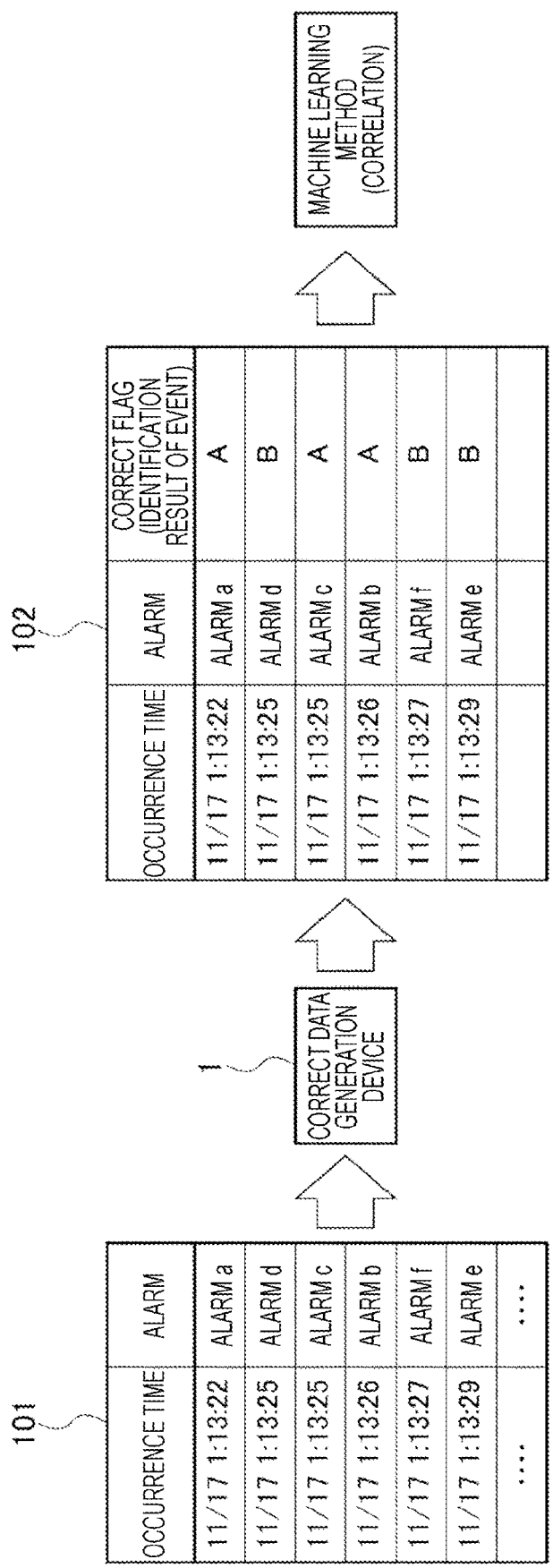
FIG. 1 is an explanatory diagram illustrating an outline of an embodiment of the present invention.

FIG. 1 is an explanatory diagram for explaining an outline of the present embodiment. A correct data generation device 1 of the present embodiment receives an input of alarm history information (hereinafter, "alarm information") 101 output from a plurality of devices (for example, network devices or the like). The correct data generation device 1 correlates each alarm included in the alarm information 101 in units of events, and generates and outputs correct data 102 in which identification information of an event corresponding to each alarm is set as a correct flag. The correct data 102 can be used for machine learning of alarm correlation.

Figure 2:
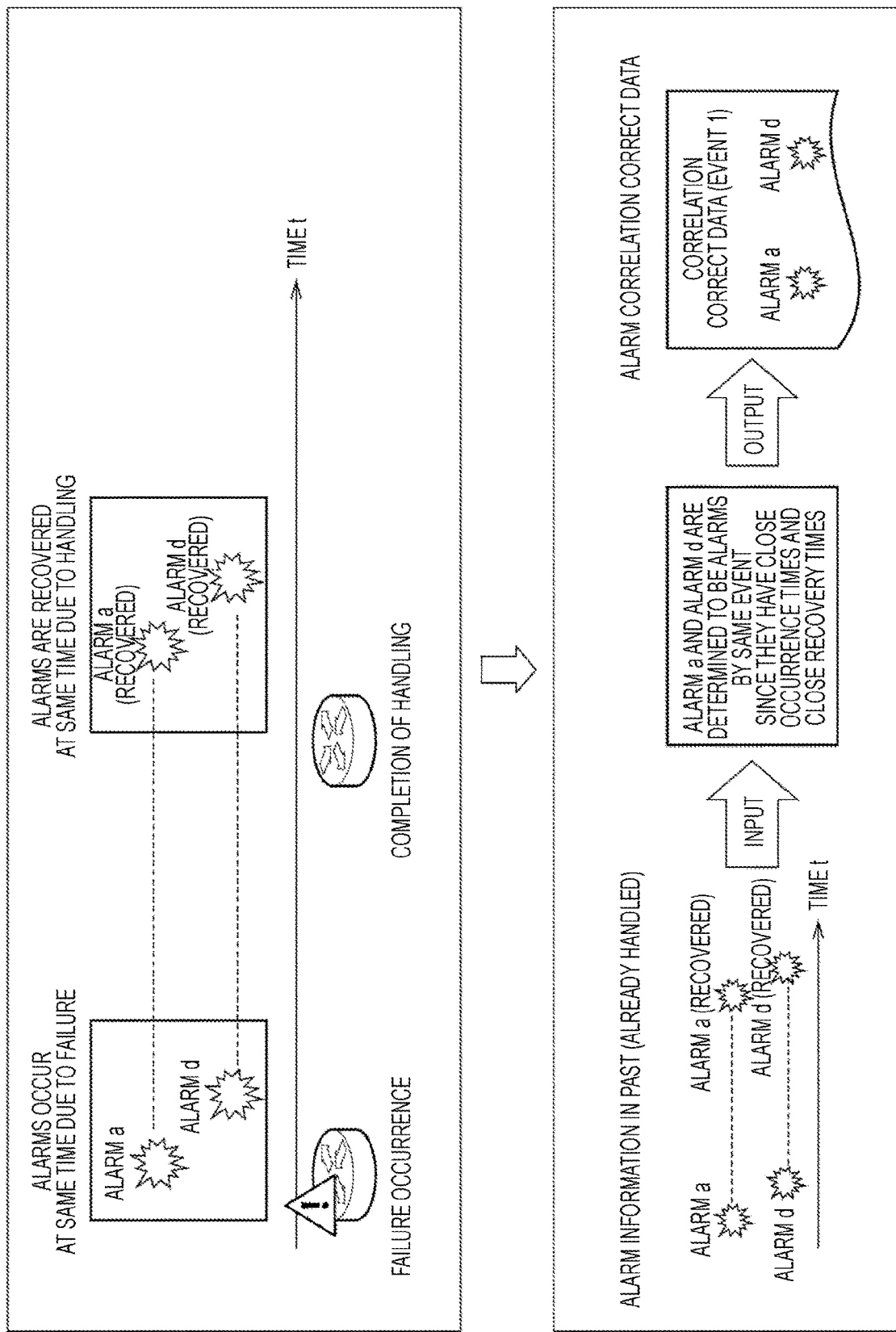
FIG. 2 is an explanatory diagram illustrating features of alarms and correlation of alarms.

FIG. 2 is an explanatory diagram illustrating features of alarms and correlation of alarms. In general, alarms are simultaneously generated from a plurality of devices due to an event such as a failure or construction. However, when failure handling or construction is completed and the root cause is removed, the alarms are recovered simultaneously.

In the illustrated example, an alarm a and an alarm d occur almost simultaneously due to failure occurrence 201 (event). Then, the alarm a and the alarm d indicating recovery are generated almost simultaneously in response to completion of handling 202 of the failure occurrence 201. That is, the alarms that have occurred by the same event have features that the occurrence times are close and the recovery times are close.

In the present embodiment, on the basis of this feature, among past alarms for which handling has been completed, alarms having close occurrence times and close recovery times are determined as a group of alarms that have occurred by the same event, and correct data in which identification information of the same event is set to each alarm of the group of alarms is generated. As a result, it is possible to easily generate correct data used for machine learning only by inputting past alarm information for which handling has been completed to the correct data generation device 1. Therefore, in the present embodiment, operation by a maintenance person can be made unnecessary.

In the illustrated example, the correct data generation device 1 determines the alarms a and d having close occurrence times and close recovery times as alarms by the same event, and generates correct data in which identification information of the event is set to the alarms a and d.

Figure 3:
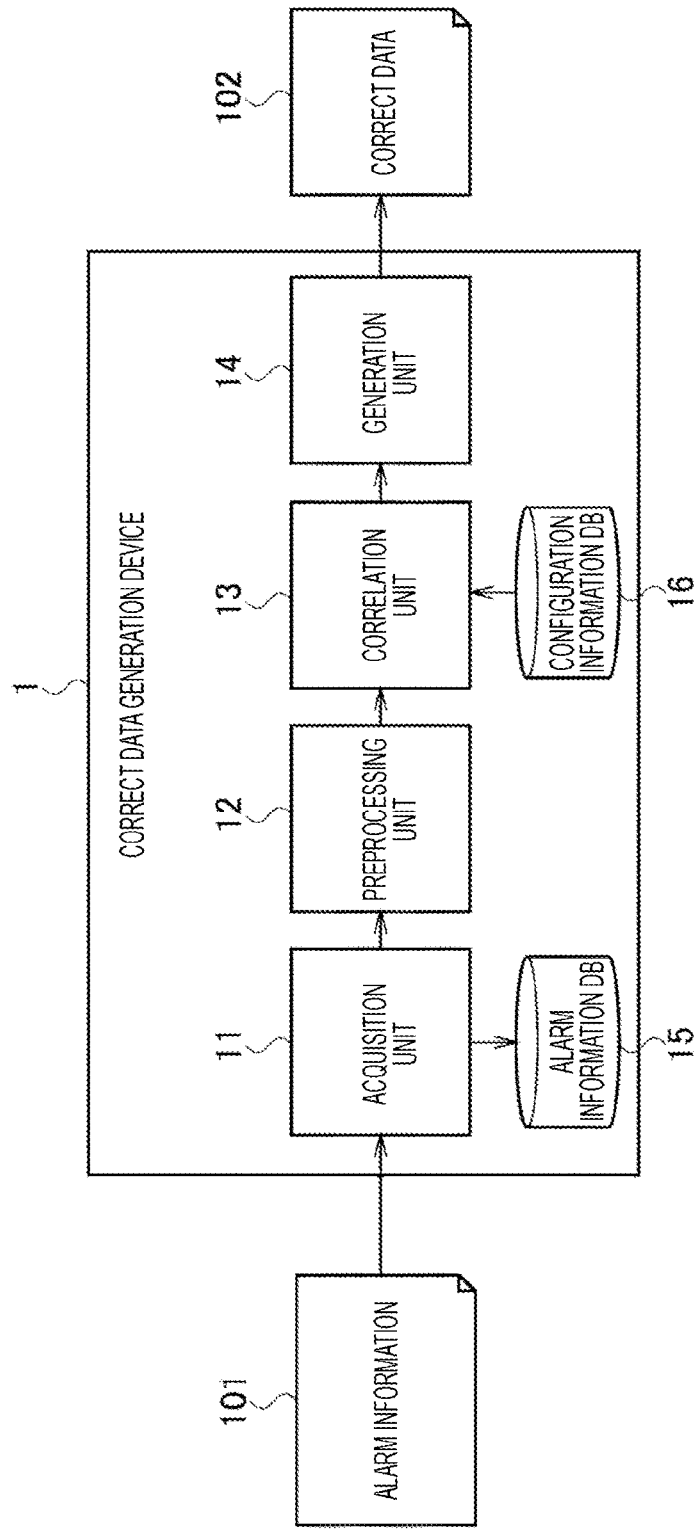
FIG. 3 is a configuration diagram illustrating a configuration of a correct data generation device of the present embodiment.

FIG. 3 is a configuration diagram illustrating a configuration of the correct data generation device 1 of the present embodiment. The illustrated correct data generation device 1 includes an acquisition unit 11, a preprocessing unit 12, a correlation unit 13, a generation unit 14, an alarm information DB 15, and a configuration information DB 16.

The acquisition unit 11 acquires alarm information 101 output (issued) from a plurality of devices and stores the acquired alarm information 101 in the alarm information DB 15. For example, the acquisition unit 11 acquires alarm information from at least one operation system (OpS). A device (for example, a network device) of a general communication carrier is monitored by the OpS. The OpS provides functions of collecting alarm information from a device, displaying an alarm screen for a maintenance person, or other function. The acquisition unit 11 acquires the alarm information stored in the OpS at a predetermined timing (for example, every n minutes), stores the alarm information in the alarm information DB 15, and sends the alarm information to the preprocessing unit 12.

The preprocessing unit 12 preprocesses each alarm of the alarm information 101. Each alarm includes, for example, an alarm type, an occurrence time or a recovery time, a device ID, location information (physical location), and the like. In the present embodiment, since an alarm occurrence time and a recovery time are used, the preprocessing unit 12 associates an alarm including an occurrence time with an alarm including a recovery time by using an alarm type, a device ID, and the like as keys. As a result, the correlation unit 13 can acquire the occurrence time and the recovery time of each alarm.

Examples of the alarm type include a type indicating a device failure (for example, Eqp failure alarm) and a type indicating an interface-related abnormality of a device (for example, link down alarm). The location information indicates a physical position (for example, installed buildings, areas, and the like) of the device that has issued the alarm, and the like.

The correlation unit 13 associates, from the alarm information 101, alarms whose occurrence times are within a predetermined time width (within a first time width) and whose recovery times are within a predetermined time width (within a second time width), as a group of alarms that have occurred by the same event. That is, the correlation unit 13 groups a plurality of alarms whose occurrence times are within a predetermined time width and whose recovery times are within a predetermined time width.

In other words, the correlation unit 13 sets, as a group of alarms by the same event, another alarm that has occurred before and after a certain alarm occurrence time t1 (within a first time width) and that has occurred before and after a recovery time t2 (within a second time width). The same value or different values may be used for the first time width of the occurrence time and the second time width of the recovery time.

Figure 4:
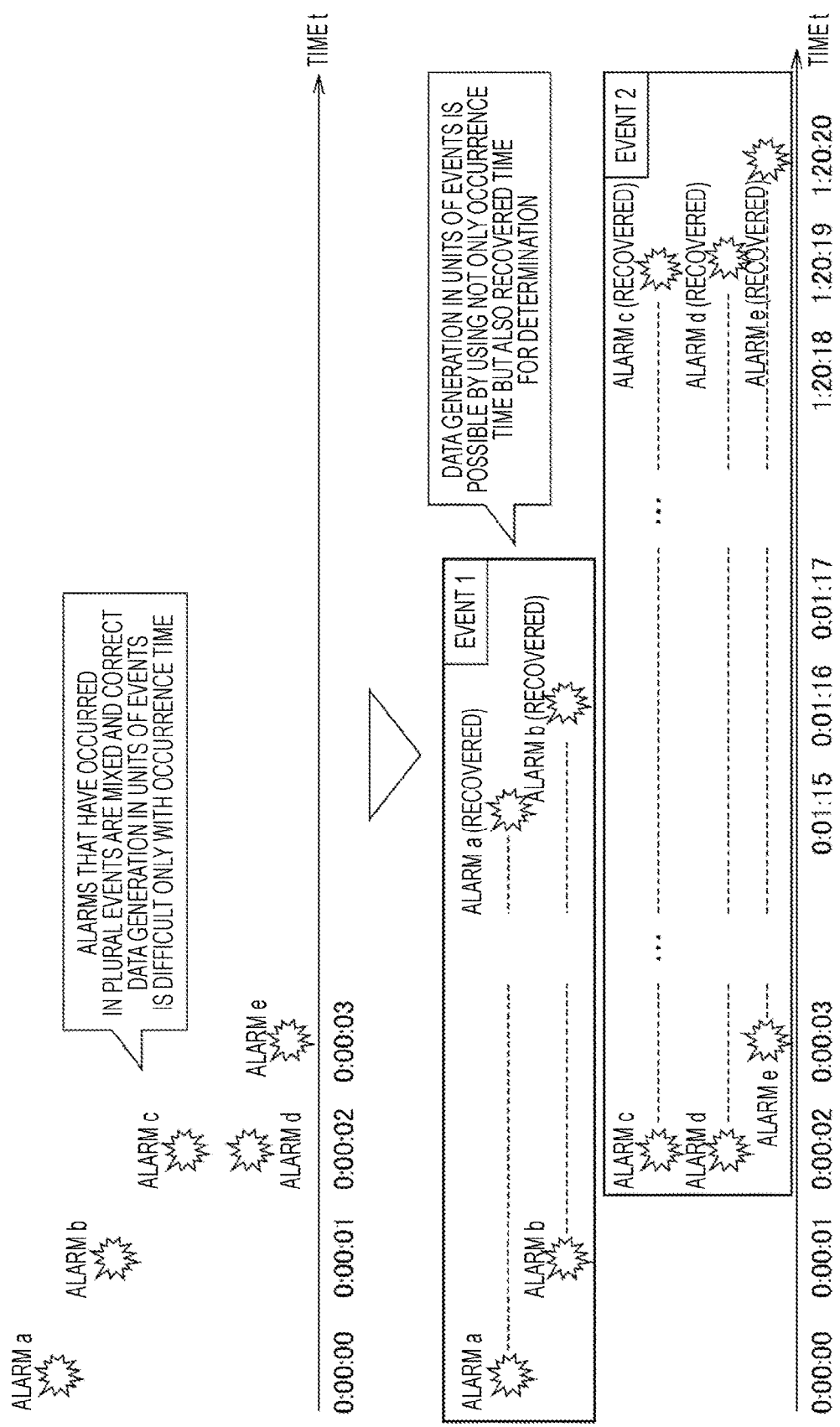
FIG. 4 is a diagram illustrating an image of correlation of alarms.

FIG. 4 is a diagram illustrating an image of correlation of alarms.

The reference numeral 401 indicates occurrence times of the alarms a to e. The alarms a to e caused by a plurality of events occur in a short time width. In such a case where a plurality of events occur simultaneously, it is difficult to classify an alarm into event units only by the occurrence time.

A reference numeral 402 indicates correlation of the correlation unit 13 of the present embodiment.

Specifically, the correlation unit 13 associates the alarm a and the alarm b whose occurrence times are within the first time width (here, within 1 second) and whose recovery time is within the second time width (here, within 1 second) as a group of alarms generated by the same event 1.

The correlation unit 13 associates the alarm c, the alarm d, and the alarm e whose occurrence times are within the first time width and whose recovery times are within the second time width, as a group of alarms generated by the same event 2. As described above, the correlation unit 13 can easily group each alarm into event units by using the closeness of the occurrence time and the closeness of the recovery time.

The correlation unit 13 may narrow down each alarm of a group of alarms grouped as alarms by the same event by using location information included in the alarm information. The location information indicates a location (physical position) where the device that has issued the alarm is disposed.

Specifically, the correlation unit 13 may extract only alarms whose device locations are close from a group of alarms grouped by using occurrence time and recovery time, and may delete alarms whose device locations are far from the group of alarms. Being close in location means that a certain device and another device are disposed within a predetermined range (within a predetermined distance). Being far in location means that another device is disposed outside a predetermined range from the position of a certain device.

For example, in the group of alarms (alarms c, d, e) of the event 2 illustrated in FIG. 4, the correlation unit 13 may regard the alarm d of the device at a position close to (or at the same position as) the physical position of the device of the alarm c as alarms by the same event 2, and may delete the alarm e of the device at a position far from the device of the alarm c and the device of the alarm d from the regarded group of alarms as an alarm not by the same event 2.

The correlation unit 13 may acquire the location information of each alarm from the configuration information DB 16. The configuration information DB 16 is a database that stores information regarding a network configuration of each device. The information regarding the network configuration includes a device ID, location information, an IP address, a port (IF), connection destination information of the port, and the like of each device. In this case, the correlation unit 13 may acquire the location information of each alarm of the group of alarms from the configuration information DB 16 by using the device ID or the like included in the alarm as a key, and narrow down each alarm of the group of alarms by using the location information.

The generation unit 14 generates correct data in which identification information of a common event is set to each alarm of the associated group of alarms. For example, as in correct data 102 illustrated in FIG. 1, the generation unit 14 may extract an alarm in which occurrence time is set from the alarm information 101, set an identifier of an event correlated with each extracted alarm as a correct flag, and generate the correct data 102. When the correlation unit 13 narrows down the group of alarms by using the location information, the generation unit 14 may delete the deleted alarm from the correct data 102, or may set a flag indicating that the alarm is excluded from the correct flag.

Figure 5:
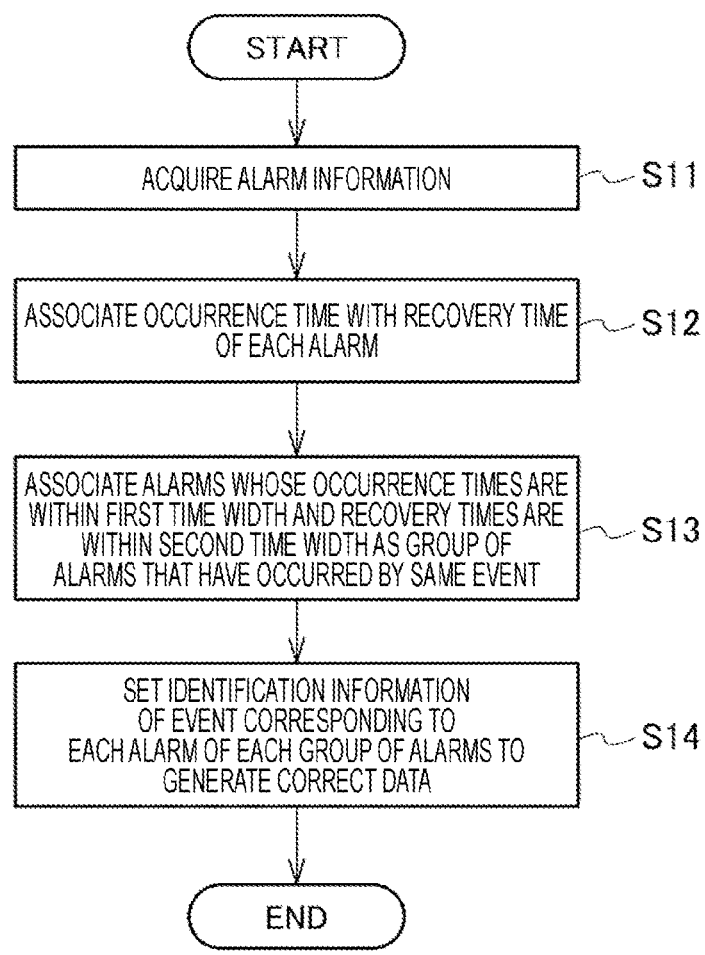
FIG. 5 is a flowchart illustrating operation of the correct data generation device.

FIG. 5 is a flowchart illustrating operation of the correct data generation device 1. The acquisition unit 11 acquires the alarm information issued by each device from, for example, the OpS or the like at a predetermined timing (time interval) (S11). The preprocessing unit 12 associates the occurrence time with the recovery time for each alarm included in the alarm information (S12).

The correlation unit 13 associates, from the alarm information 101, alarm whose occurrence times are within a first time width and whose recovery times are within a second time width, as a group of alarms that have occurred by the same event (S13). The correlation unit 13 may narrow down the alarm of each associated group of alarms by using the location information. The generation unit 14 generates correct data in which identification information of a corresponding event is set for each alarm of the group of alarms, and outputs the generated correct data (S14).

The correct data generation device 1 of the present embodiment described above includes: an acquisition unit 11 that acquires alarm information output from a plurality of devices; a correlation unit 13 that associates, from the alarm information, alarms whose occurrence time are within a first time width and recovery times are within a second time width, as a group of alarms that have occurred by the same event; and a generation unit 14 that generates correct data in which identification information of the event is set for each alarm of the group of alarms that has been associated.

As a result, in the present embodiment, it is possible to easily generate correct data for causing machine learning of association (correlation) of an alarm. Specifically, by automating the creation of correct data that imparts a heavy burden to a maintenance person, it is possible to efficiently generate correct data only by inputting past alarm information.

The correlation unit 13 of the present embodiment may narrow down each alarm of the group of alarms by using location information of the device. By using the location information (physical position) of the device, an alarm can be associated with high accuracy.

Figure 6:
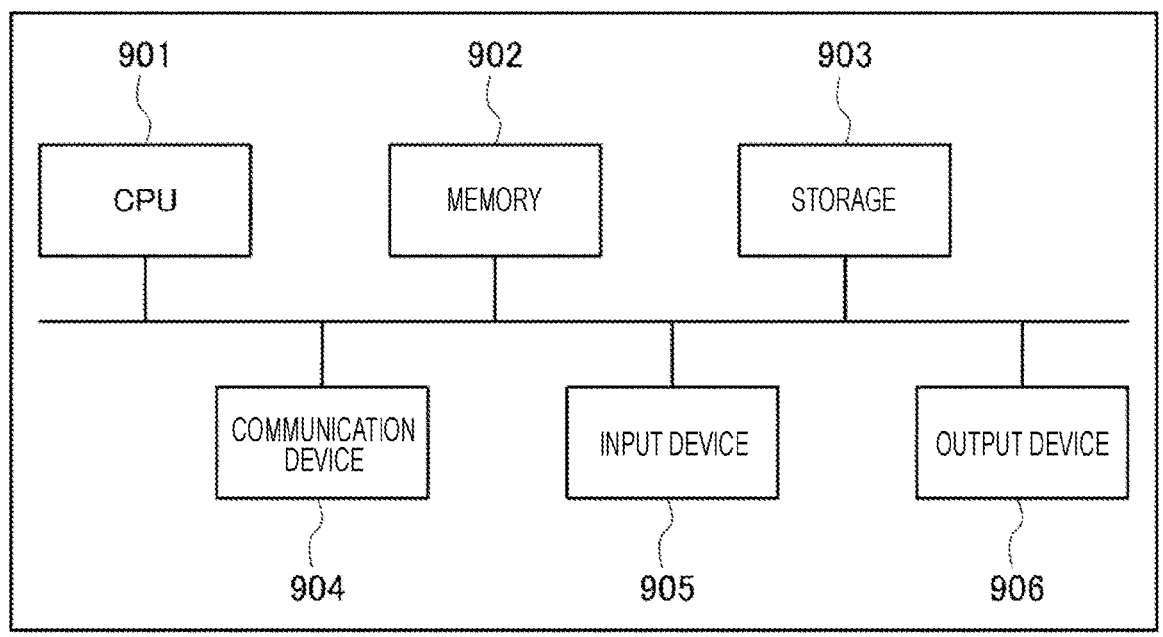
FIG. 6 is a hardware configuration example.

For the correct data generation device 1 described above, for example, a general-purpose computer system as illustrated in FIG. 6 can be used. The illustrated computer system includes a central processing unit (CPU, processor) 901, a memory 902, a storage 903 (hard disk drive (HDD), solid state drive (SSD)), a communication device 904, an input device 905, and an output device 906. The memory 902 and the storage 903 are storage devices. In the computer system, each function of the correct data generation device 1 is implemented by the CPU 901 executing a predetermined program loaded on the memory 902.

The correct data generation device 1 may be implemented by one computer or may be implemented by a plurality of computers. The correct data generation device 1 may be a virtual machine that is implemented in a computer.

The program for the correct data generation device 1 can be stored in a computer-readable recording medium such as an HDD, an SSD, a universal serial bus (USB) memory, a compact disc (CD), or a digital versatile disc (DVD), or can be distributed via a network.

The present invention is not limited to the embodiments and the modification, and various modifications can be made within the scope of the gist of the present invention.

REFERENCE SIGNS LIST

1 Correct data generation device
11 Acquisition unit
12 Preprocessing unit
13 Correlation unit
14 Generation unit
15 Alarm information DB
16 Configuration information DB (configuration information storage unit)

The invention claimed is:

1. A correct data generation device comprising:
  an acquisition unit, including one or more processors, configured to acquire alarm information output from a plurality of devices;
  a correlation unit, including one or more processors, configured to associate, from the alarm information, a group of alarms that have occurred by a same event, the associating comprises:
  determining if two or more alarms have occurrence times within a first time width;
  determining if the two or more alarms have recovery times within a second time width;
  determining if the two or more alarms occurred at a same location; and
  in response to determining that (i) the two or more alarms have the occurrence times within the first time width, (ii) the two or more alarms have the recovery times within the second time width, and (iii) the two or more alarms occurred at the same location, associating the two or more alarms as the group of alarms that have occurred by the same event; and a generation unit, including one or more processors, configured to generate correct data in which identification information of the event is set for each alarm of the group of alarms that has been associated, and use the correct data to perform machine learning of an alarm correlation model configured to perform association of an alarm.

2. The correct data generation device according to claim 1, wherein the alarm includes location information of a device that has issued the alarm.

3. The correct data generation device according to claim 1, further comprising a configuration information storage unit in which location information of each device is stored.

4. A correct data generation method performed by a correct data generation device, the method comprising steps of:

acquiring alarm information output from a plurality of devices;

associating, from the alarm information, a group of alarms that have occurred by a same event, the associating comprises:

determining if two or more alarms have occurrence times within a first time width;

determining if the two or more alarms have recovery times within a second time width;

determining if the two or more alarms occurred at a same location; and in response to determining that (i) the two or more alarms have the occurrence times within the first time width, (ii) the two or more alarms have the recovery times within the second time width, and (iii) the two or more alarms occurred at the same location, associating the two or more alarms as the group of alarms that have occurred by the same event; and generating correct data in which identification information of the event is set for each alarm of the group of alarms that has been associated; and using the correct data to perform machine learning of an alarm correlation model configured to perform association of an alarm.

5. A non-transitory computer-readable storage medium storing a program for causing a computer perform operations comprising:

acquiring alarm information output from a plurality of devices;

associating, from the alarm information, a group of alarms that have occurred by a same event, the associating comprises:

determining if two or more alarms have occurrence times within a first time width;

determining if the two or more alarms have recovery times within a second time width;

determining if the two or more alarms occurred at a same location; and in response to determining that (i) the two or more alarms have the occurrence times within the first time width, (ii) the two or more alarms have the recovery times within the second time width, and (iii) the two or more alarms occurred at the same location, associating the two or more alarms as the group of identified alarms that have occurred by the same event; and generating correct data in which identification information of the event is set for each alarm of the group of alarms that has been associated; and using the correct data to perform machine learning of an alarm correlation model configured to perform association of an alarm.

6. The correct data generation method according to claim 4, wherein the alarm includes location information of a device that has issued the alarm.

7. The correct data generation method according to claim 4, further comprising:

storing location information of each device in a configuration information storage unit.

8. The non-transitory computer-readable storage medium according to claim 5, wherein the alarm includes location information of a device that has issued the alarm.

9. The non-transitory computer-readable storage medium according to claim 5, wherein the operations further comprise:

storing location information of each device in a configuration information storage unit.

* * * * *